| United States Patent [19] | [11] Patent Number: 4,847,225 |
| Lussier | [45] Date of Patent: * Jul. 11, 1989 |

[54] CATALYSTS AND CATALYST SUPPORTS

[75] Inventor: Roger J. Lussier, Ellicott City, Md.

[73] Assignee: W. R. Grace & Co.-Conn., New York, N.Y.

[ * ] Notice: The portion of the term of this patent subsequent to Jun. 7, 2005 has been disclaimed.

[21] Appl. No.: 165,697

[22] Filed: Mar. 9, 1988

Related U.S. Application Data

[63] Continuation of Ser. No. 802,484, Nov. 27, 1985, abandoned, which is a continuation-in-part of Ser. No. 657,859, Oct. 5, 1984, abandoned.

[51] Int. Cl.$^4$ .......................... B01J 21/12; B01J 21/16
[52] U.S. Cl. .......................................... 502/68; 502/84; 502/238; 502/243; 502/250; 502/341; 502/344; 502/524; 502/80
[58] Field of Search ................... 502/68, 80, 243, 411, 502/63, 84, 524, 65, 66, 238, 243, 341, 250, 344

[56] References Cited

U.S. PATENT DOCUMENTS

| 3,506,594 | 4/1970 | Haden et al. | 502/68 |
| 3,867,308 | 2/1975 | Elliott | 502/68 |
| 3,883,444 | 5/1975 | Maselli et al. | 423/213.5 |
| 3,932,268 | 1/1976 | Haden, Jr. et al. | 502/68 |
| 4,131,616 | 12/1978 | Stiles | 260/449 M |
| 4,332,699 | 6/1982 | Nozemack | 502/68 |
| 4,458,023 | 7/1984 | Welsh et al. | 502/65 |
| 4,542,118 | 9/1985 | Nozemack et al. | 502/263 |
| 4,608,357 | 8/1986 | Silverman et al. | 502/84 |
| 4,749,672 | 6/1988 | Lussier | 502/68 |

FOREIGN PATENT DOCUMENTS 0967136  5/1975  Canada .................................. 502/84

Primary Examiner—Anthony McFarlane
Attorney, Agent, or Firm—Arthur P. Savage

[57] ABSTRACT

Catalytic compositions which comprise alumina bound spinel and/or spinel-mullite mixtures having an alkali metal content of below about 0.50 weight percent, preferably below about 0.10. The compositions are obtained by calcining a caustic leaching preformed particulate composites of clay and alumina sol, preferably chlorhydrol. The catalysts are particularly useful for the catalytic cracking of heavy hydrocarbon feedstocks to obtain gasoline and light cycle oil. When used for cracking feedstocks high in vanadium content these compositions may contain added alkaline earth oxide in order to passivate the vanadium.

10 Claims, No Drawings

CATALYSTS AND CATALYST SUPPORTS

This is a continuation, of application Ser. No. 802,484, filed Nov. 27, 1985, abandoned, which is a CIP of my U.S. Ser. No. 657,859, filed Oct. 5, 1984 abandoned.

The present invention relates to catalysts and catalyst supports, and more particularly to highly active catalytic cracking catalysts which are derived from kaolin.

Catalysts used for the catalytic cracking of hydrocarbons typically comprise amorphous silica alumina gels, clay and/or crystalline aluminosilicate zeolites which are formed into particles of desired shape, size and hardness. As disclosed in U.S. Pat. Nos. 3,932,268, 3,647,718 and 3,657,154, silica-alumina and zeolite components used in the preparation of catalysts may be derived from clays such as kaolin. Furthermore, as shown in U.S. Pat. Nos. 3,957,689, 3,912,619 and Canadian No. 967,136, zeolite containing catalyst compositions may contain a substantial quantity of raw kaolin which is formed into hard, attrition resistant catalytic composites by the addition of suitable binders such as silica, silica-alumina, or alumina sol, including chlorhydrol.

As disclosed by Brindley and Nakahira, Journal of the American Ceramic Society, Vol. 42, No. 7, pp. 319–323, (1959) kaolinite is converted to a material which contains an aluminum silicon spinel when heated to about 925° to 950° C. Furthermore, heating to temperatures of about 1050° C. results in the formation of a mullite phase. In both cases some of the silica in the kaolin is converted into a caustic soluble amorphous phase or at higher temperatures into crystobalite, a crystalline silica.

In recent years the refinery industry has been utilizing increasing amounts of heavy (residual) hydrocarbon feedstocks in the production of gasoline and light cycle oil. These heavy feedstocks are catalytically cracked in the presence of catalysts which must be active, resistant to deactivation by metals, attrition resistant and cheap.

Clay, and particularly kaolin, due to its availability and relatively low cost, is a particularly attractive raw material source for the production of catalytic cracking catalysts which are used in substantial quantities in the processing of contaminated residual feedstocks.

It is therefore an object of the present invention to provide improved low cost catalysts and catalyst supports.

It is a further object to provide catalytic cracking catalysts which are derived from clays that are highly active, attrition resistant and inexpensive to manufacture on a commercial scale.

It is another object to provide low cost clay derived cracking catalysts which may be blended with conventional zeolite containing catalysts to obtain compositions which are particularly effective for the cracking of residual feedstocks.

These and further objects of the present invention will become readily apparent to one skilled in the art by the following detailed description and specific examples.

Broadly, my invention contemplates catalysts and catalyst supports which comprise spinel-mullite-gamma alumina containing composites wherein the spinel-mullite phase is characterized as having a silica to alumina ratio of below about 1.5, and the composites have a sodium content of below about 0.50 weight percent expressed as $Na_2O$.

More specifically, I have found that highly active catalytic cracking catalysts may be obtained by a process which includes the following steps:

(1) Clay, preferably kaolin, is mixed with basic aluminum chloride sol (chlorhydrol);

(2) The mixture is formed into particulate kaolin-chlorhydrol composites of desired shape and size;

(3) The composites are calcined at a temperature of from about 1700° to 2200° F.;

(4) The calcined composites are reacted with an alkali metal hydroxide solution, preferably sodium hydroxide solution to remove a portion of the silica;

(5) The reacted composites are washed and ion-exchanged to remove soluble salts.

In a particularly preferred practice of the invention, the ion exchanged composites are combined with a conventional zeolite containing fluid cracking catalyst to form physical blends of the spinel-mullite-gamma alumina compositions of the present invention with conventional zeolite containing fluid cracking catalysts to obtain a catalyst mixture which is particularly effective for the processing of high molecular weight (heavy residual type) hydrocarbon feedstocks.

The basic aluminum chloride sol (chlorhydrol) which is combined with the clay, possesses the general chemical formula: $Al_{2+m}(OH)_{3m}Cl_6$ wherein $m=4$ to 12 is available commercially or may be prepared by reacting aluminum metal and/or alumina with hydrochloric acid as disclosed in U.S. Pat. No. 2,196,016, U.S. Pat. No. 4,176,090 and Canadian No. 967,136. The chlorhydrol solution contains from about 20 to 35 weight percent solids and is combined with the clay, preferably kaolin, in amounts which provide a formable mixture, i.e. from about 20 to 60 solids.

In a preferred practice of the invention where a fluid cracking catalyst (FCC) is prepared, a mixture comprising from about 75 to 95 weight percent kaolin, 5 to 25 weight percent chlorhydrol as $Al_2O_3$ (dry basis) and the balance water is spray dried at an inlet temperature of 500° to 1000° F. to obtain microspheres having a particle size of about 20 to 200 microns. The spray dried kaolin/chlorhydrol mixtures are then calcined at a temperature of 1700° to 2200° F. for a time sufficient to convert the kaolin clay to a spinel-mullite phase and amorphous silica, and the chlorhydrol to a cohesive gamma alumina binder. The X-ray diffraction pattern of the calcined product is similar to that of gamma-alumina and as shown in the previously cited article of Brindley and Nakahira, and set forth in Table A below.

TABLE A

Comparison of Lattice Spacings and Lattice Parameters of the Spinel-Type Phase from Kaolinite and of Gamma Alumina[1]

| hkl | Intensity[2] | Spinel-type phase (1) | Spinel-type phase (2) | Gamma Alumina (1) | Gamma Alumina (2) |
|---|---|---|---|---|---|
| 400 | S | 1.971 (7.884) | 1.973 (7.892) | 1.976 (7.904) | 1.977 (7.908) |
| 440 | VS | 1.394 (7.885) | 1.394 (7.885) | 1.397 (7.900) | 1.398 (7.906) |
| 444 | W | 1.138 (7.884) | | 1.141 (7.905) | |
| 731 | W | | | 1.030 (7.911) | |
| 800 | VW | | | 0.9879 (7.903) | |
| 840 | VW | | | 0.8845 (7.910) | |

[1]G. W. Brindley and M. Nakahira, "III, The High Temperature Phase," J. AM. Ceram. Soc., 42(7), 319–24.
[2]S = strong, VS = very strong, W = weak, VW = very weak.
[3]Kaolinite calcined at 950° C.

The calcined microspheres are then reacted with an alkali metal hydroxide solution, preferably sodium hydroxide solution, that contains about 5 to 50 weight percent NaOH, for a period of 5 to 240 minutes at a temperature of 100° to 212° F. The quantity of sodium hydroxide solution used during the reaction ranges from 1.5 to 10 parts by weight solution per part by weight microspheres.

During reaction with the sodium hydroxide solution, silica is removed (leached) from the microspheres to obtain a composition that contains from about 45 to 95 percent by weight spinel having the chemical formula 0.4–2.0 $Al_2O_3.SiO_2$, 0 to 50 percent by weight mullite having the chemical formula 3 $Al_2O_3$:2 $SiO_2$ and 5 to 25 percent by weight gamma alumina binder.

Subsequent to reaction with sodium hydroxide solution, the microspheres are washed with water to remove soluble salts, such as sodium silicate, and ion exchanged with ammonium sulfate solution to remove additional sodium ions. In addition, the microspheres may be treated with solutions of alkaline earth metal salt (Mg and Ca in particular) to impart a level of alkaline earth content of up to about 10 weight percent and preferably 1 to 5 weight percent recovered as alkaline earth metal oxide.

The finished spinel-alumina/mullite catalyst supports and catalysts have the following characteristics:

(a) A composite alkali metal content of below about 0.50% by weight $Na_2O$;

(b) An alumina binder content of from about 5 to 25 percent by weight calculated as $Al_2O_3$;

(c) A spinel content of from about 75 to 95 percent by weight, wherein the spinel component has the mole ratio formula 0.4 to 2.0 $Al_2O_3.SiO_2$ (d) A mullite content of from about 0 to 50 percent by weight, wherein the mullite component has the mole ratio formula 3 $Al_2O_3.2 SiO_2$ In addition, the catalyst/support compositions have the following physical characteristics:

(a) A surface area of from about 100 to 300 $m^2/g$ as measured by BET nitrogen absorbtion technique.

(b) A pore volume distribution which is characterized as follows:

(1) A total pore volume of from about 0.30 to 0.70 cc/g.

(2) A maximum number of pores in pores between 35 and 55 Å in diameter.

(3) Little or no pore volume in pores less than 30 Å in diameter.

(4) A pore volume distribution as follows: 0.20 to 0.50 cc/g in pores of less than 100 Å in diameter, 0.05 to 0.20 cc/g in pores ranging from 100 to 600 Å in diameter, and 0.05 to 0.30 cc/g in pores above 600 Å in diameter.

(c) Particle size:

(1) Ranging preferably from about 20 to 200 microns when the product is prepared in spray dried (fluid microsphere) form.

(2) Ranging from 0.2 to 4 mm when the composition is prepared in forms of pills, granules, extrudates and spheres for use as catalyst supports.

(3) An attrition resistance characteristic of from about 2 to 20 as measured by the Davison Index (DI) and 0.2 to 2.0 Jersey Index (JI) as determined by the methods set forth in U.S. Pat. No. 4,247,420.

(d) X-ray Diffraction Pattern:

An X-ray diffraction pattern similar to that described by Brindley (Table A) of material mostly in the silica-alumina spiral form or if calcined at a higher temperature may contain a high level of mullite. Typical X-ray patterns (using only the strongest peaks) for the materials are:

TABLE B

| $SiO_2$—$Al_2O_3$ Spinel | | Mullite | |
|---|---|---|---|
| 2Q | Intensity | 2Q | Intensity |
| 45.8 | 10 | 26.0 | 10 |
| 67.3 | 10 | 40.8 | 8 |
| 37.3 | 6 | 60.4 | 8 |
| 39.5 | 6 | | |
| 46.5 | 6 | | |

In one preferred embodiment of the invention the cracking catalysts which are prepared in microspheroidal form having a particle size predominantly in the range of from about 20 to 200 microns are used as FCC catalysts and/or blended with conventional zeolite containing fluid catalytic cracking catalysts (FCC catalysts) in amounts ranging from about 2.5 to 80 percent by weight FCC catalyst. The conventional FCC catalysts utilized in this embodiment of the invention are commercially available and typically comprise crystalline aluminosilicate zeolites such as rare-earth exchanged faujasite (type Y zeolites) and/or the ZSM type zeolites and are prepared in accordance with the methods typically disclosed in U.S. Pat. Nos. 3,867,308 and 3,957,689. The catalyst blends, particularly those containing alkaline earth metal oxide, are particularly effective for the catalytic cracking of high molecular weight petroleum feedstocks which contain high levels of vanadium.

A more clear understanding of my invention may be obtained by reference to the following detailed description and specific examples.

EXAMPLE 1

Clay microspheres were prepared using 10 weight percent $Al_2O_3$ binder and 90 weight percent kaolin. 3,404 g basic aluminum chloride (aluminum chlorhydrol having the formula $Al_2(OH)_5Cl$ containing 23.5 weight percent $Al_2O_3$) was added to a 10 gallon tank. 8,372 g of kaolin clay was added with agitation and $H_2O$ as required to make a workable slurry. After mixing thoroughly the slurry containing about 50 weight percent solids was spray dried at an inlet temperature of 600° F. A portion of this sample was calcined for 1 hour at 1800° F. and the physical properties at this point were: ABD/CD (average bulk density/compacted density)=0.95/1.04; DI/JI=1/0.2; SA (surface area)=33 $m^2/g$. 250 g of the calcined microspheres were added to 500 ml solution containing 125 g NaOH and boiled under reflux for 1 hour. The sample was then filtered, washed 2X ½ liter hot deionized $H_2O$, reslurried in ½ liter $H_2O$ and the pH adjusted to 4.0 using acidified aluminum sulfate solution, aged ¼ hour at 150° F. @pH 4.0, filtered, and washed on the filter one time with ½ liter hot $H_2O$, one time with ½ liter pH 9.0 $HO_2O$ (adjusted with $NH_4$), and one time with ½ liter hot $H_2O$ and oven dried. The analysis of this sample was Wt. % $Na_2O$=0.52, Wt. % $Al_2O_3$=75.33, ABD/CD=0.79/.83, SA=191, DI/JI=11/0.8. 71 g (as is) of this material was exchanged with 35.5 g $(NH_4)_2SO_4$ in 710 ml $H_2O$ for ½ hour at 150° F., filtered, washed three times with 355 ml hot $H_2O$ and oven dried at 250° F. Microactivity tests (as determined in accordance with ASTM Test Procedure D-3907) on this sample after an 8 hour, 1350° F., 100% steam treatment gave 36 volume percent conversion for the non- ($NH_4)_2SO_4$ exchanged sample and 64 volume percent conversion for the $(NH_4)_2SO_4$ exchanged sample. This is a very high activity for a non-zeolite promoted catalyst.

EXAMPLE 2

This example shows the excellent hydrothermal stability of the caustic leached clay microsphere. Caustic leached clay microspheres were prepared as described in Example 1, except they were exchanged twice with $(NH_4)_2SO_4$ using 0.5 g $(NH_4)_2SO_4$/g leached product. The properties of this sample were: ABD/CD=0.70/0.81, DI/JI=11/1.0, Wt. % Na$_2$O=0.071, Wt. % Al$_2$O$_3$ =68.27. This sample gave 67.7% conversion in a standard microactivity test after a 2 hour @1250° F. thermal treatment, and 60.6% conversion after an 8 hour, 1350° F., 100% steam deactivation. This 90% retention of activity is exceptionally good for a non-zeolite promoted catalyst.

EXAMPLE 3

This example shows that the unleached microsphere has very low cracking activity compared to the leached samples prepared in Examples 1 and 2. 5,320 g aluminum chlorhydrol solution (of Example 1) were added to a 10 gallon tank and 10,174 g kaolin clay added with $H_2O$ added as required to make an easily pumped slurry (50 wt. % solids). After spray drying, the microspheres were calcined for 1 hour at 1800° F. After the same steam deactivation as given to the preparations in Examples 1 and 2, this material gave 15.8% conversion in a standard microactivity test. Therefore the caustic leach substantially enhances the activity of this material.

EXAMPLE 4

This example shows that blends of the caustic leached microspheres with conventional zeolite containing FCC catalyst (Components A & C) can be used to improve metals tolerance, even at identical zeolite input. Microactivity results, summarized in Table I, show significantly better activity retention for the 5 wt. % MgO on caustic leached clay blend than for the base. In addition, coke selectivity (coke/unit kinetic conversion) is also improved over the base.

Microspheres of the present invention (Component B) were prepared by spray drying a slurry of 15.0% by weight Al$_2$O$_3$ from chlorhydrol and 85% by weight clay, and calcining for 1 hour at 1800° F. 1.0 Kg of these calcined microspheres was added to 2.0 l of solution containing 400 g NaOH and hot aging for 1½ hours at 175°–180° F., filtering, washing 3 times with 1 l room temperature deionized water, exchanged 3 times in 2.0 l solution containing 325 g $(NH_4)_2SO_4$ (pH was adjusted to 7.0 on the first exchange only with 10% $H_2SO_4$). After each exchange the catalyst was filtered, washed 1 time with 2.0 l deionized water at room temperature (3 times after last exchange) and oven dried at 121° C. overnight. 105.5 g of this material was impregnated with 65 ml of solution containing 26.6 g $MgCl_2.6 H_2O$, dried overnight at 121° C. and then calcined for 1 hour at 677° C.

Catalysts I and II which comprise components A(I) and a mixture of Components B and C(II) described in Table I was prepared and evaluated for resistance to metals deactivation. As shown in the data set forth in Table I, the activity retention of the Catalyst II of the present invention containing Component B (MgO on alumina bound spinel microsphere) is dramatically improved relative to the unblended conventional composition Catalyst I.

Furthermore, as shown in Table II, Catalyst IV which comprises a mixture of Component F (an alumina bound spinel microsphere in hydrogen ion exchanged form (via $(NH_4)_2SO_4$) and Component E also shows dramatically improved activity retention in the presence of Ni+V or V when compared to Conventional III which comprises Component D as described in Table II.

TABLE I

Effect of Mg$^{+2}$ Impregnated Caustic Leached Clay Blend Component on Metals Tolerance

| | Catalyst I | Catalyst II |
|---|---|---|
| | 100% A[1] | 62.5% B[2] |
| | | 37.5% C[3] |
| | (15% Zeolite) | (15% Zeolite) |
| 0.50 Wt. % Ni + V | | |
| Vol. % Conversion | 57.4 | 71.6 |
| H$_2$, wt. % Feed | 0.43 | 0.51 |
| Coke, wt. % feed | 3.97 | 5.49 |
| Coke/Kinetic Conv. | 2.9 | 2.2 |
| 1.0 Wt. % Ni + V | | |
| Vol. % Conversion | 29.5 | 67.4 |
| H$_2$, wt. % Feed | 0.65 | 0.82 |
| Coke, wt. % Feed | 4.95 | 6.88 |
| Coke/Kinetic Conv. | 11.8 | 3.3 |

A = 13% Al$_2$O$_3$ binder, 15% low Na$_2$O calcined rare earth Y, 72% kaolin.
B = 5% MgO on a caustic leached clay microsphere.
C = 15% Al$_2$O$_3$ binder, 40% low Na$_2$O calcined rare earth Y, 45% kaolin.

TABLE II

Effect of a Caustic Leached Clay Blend Component on Metals Tolerance

| Composition | Catalyst III | Catalyst IV |
|---|---|---|
| | 100% D | 73.5% E |
| | | 26.5% F |
| Vol. % Conversion (at 0.50 wt. % Ni + V) | 23.0 | 63.7 |
| Vol. % Conversion (at 0.25 wt. % V) | 25.0 | 62.3 |

D = 10.0% Al$_2$O$_3$ binder, 12.5% calcined rare earth Y, 77.5% Kaolin clay.
E = 12.5% Al$_2$O$_3$ binder, 17% calcined rare earth Y, 70.5% Kaolin clay.
F = 15.0% Al$_2$O$_3$ binder, 85% caustic leached spinel prepared as described in Example 2.
Microactivity Test Conditions: 500° C., 16 WHSV, 3 catalyst/oil on a West Texas Heavy Gas Oil after an 8 hour, 732° C., 100% steam treatment.

I claim:

1. A catalytic compositon comprising an aluminum silicon spinel-mullite-gamma alumina bound composite in which the spinel has a silica to alumina mole ratio of above about 0.40 and characterized by a surface area of from about 100 to 300 m$^2$/g, a total pore volume of from about 0.30 to 0.70 cc/g, the x-ray pattern set forth in Table B, and an alkali-metal oxide content of below about 0.50 weight percent.

2. The composition of claim 1 which contains from about 0.25 to 10.0 weight percent alkaline earth metal expressed as the oxide.

3. The composition of claim 1 wherein an alumina binder comprises about 5 to 25 weight percent of said composition.

4. The composition of claim 1 wherein said composition has a particle size range from about 20 to 200 microns.

5. The composition of claim 4 wherein said composition is blended with a particulate zeolite containing fluid cracking catalyst.

6. A method for preparing a catalyst composition which comprises:

(a) mixing kaolin with an aqueous solution of aluminum chlorhydrol;
(b) forming the mixture of step (a) to obtain particulate composites;
(c) calcining the particulate composites obtained at step (b) at a temperature of 1700°–2200° F. to obtain an aluminum silicon spinel-mullite-gamma alumina bound composite that contains amorphous silica;
(d) reacting the calcined particles of step (c) with aqueous alkali metal hydroxide solution to remove at least 30 percent of the amorphous silica present in the particles; and
(e) washing and ion exchanging the reacted particles to lower the alkali metal oxide content thereof to below about 0.50 percent by weight.

7. The method of claim 6 wherein the particles are formed by spray drying.

8. The method of claim 7 wherein the wherein the alkali metal hydroxide is sodium hydroxide solution.

9. The method of claim 6 wherein said reacted calcined particles are washed and ion exchanged with ammonium sulfate solution.

10. The method of claim 6 wherein the reacted particles are combined with an alkaline earth metal solution to impart an alkaline earth metal oxide content of up to 10 weight percent.

* * * * *